Jan. 25, 1949.   L. B. BROWN   2,459,914
CHUCK RECONDITIONING DEVICE
Filed June 18, 1945

L. B. Brown
INVENTOR.

BY
ATTORNEYS.

Patented Jan. 25, 1949

2,459,914

UNITED STATES PATENT OFFICE 2,459,914

CHUCK RECONDITIONING DEVICE

Louis B. Brown, Duquesne, Pa.

Application June 18, 1945, Serial No. 600,057

1 Claim. (Cl. 279—60)

This invention relates to chucks, and more particularly to chucks wherein a threaded sleeve operated by gearing, is moved over the cam surfaces of chuck jaws, to move the jaws into gripping relation with a drill bit.

For the sake of illustration, it might be stated that the gearing usually employed in operating a sleeve of a chuck to move the jaws thereof, become worn and frequently are so worn that the gearing will no longer operate the jaws.

It is therefore the object of the present invention to provide a ring which may be readily secured to the threaded chuck sleeve, the ring having sockets for the reception of a wrench, whereby the ring and sleeve to which it is connected, may be rotated to operate the jaws, independently of the gearing.

Another object of the invention is to provide an adapting ring of this character wherein the wrench sockets are so arranged that the wrench used in rotating the ring and sleeve, will fall by gravity from the chuck after the adjustment of the jaws has been made, and the wrench released by the operator, thereby insuring against an operator leaving the wrench connected with the chuck to be thrown therefrom with the starting of the operation of the chuck.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 3:
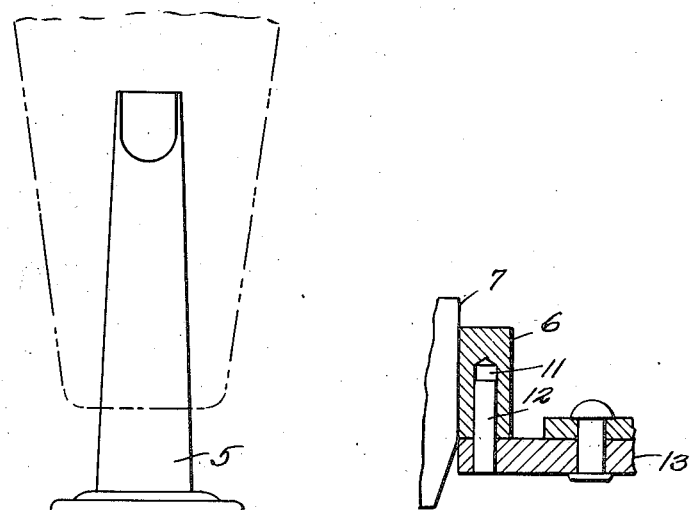
Figure 3 is a sectional view taken on line 3—3 of Fig. 2.

Referring to the drawing in detail, the reference charater 5 indicates the shank of a chuck, and the reference character 6 indicates the attachment or ring, forming the subject matter of the present invention. As shown, the ring 6 is secured directly on the threaded sleeve 7 which is provided with internal cam surfaces adapted to engage the cam surfaces of the jaws 8 of the chuck, to move the jaws into gripping relation with a drill bit.

Figure 1:
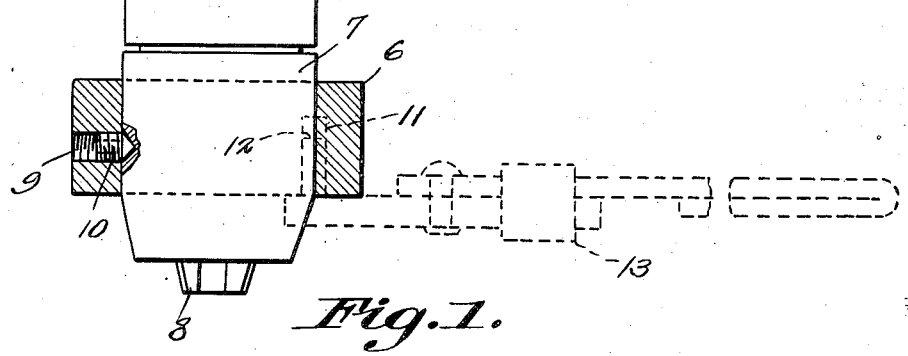
Figure 1 is an elevational view of a chuck illustrating a ring, constructed in accordance with the invention, as positioned thereon.
Figure 2:
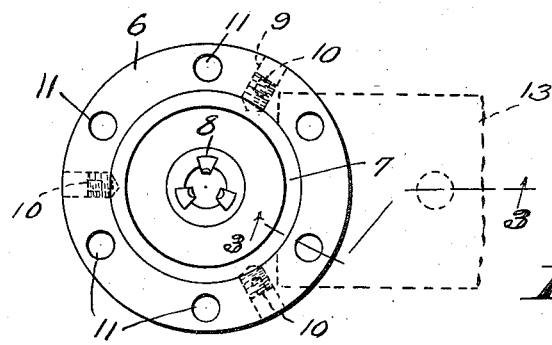
Figure 2 is a bottom plan view of the chuck with the ring secured thereto.

In order that the ring 6 will be secured to the sleeve 7 against rotary movement with respect to the sleeve, the ring is provided with openings 9 in which the screws 10 are positioned, the screws 10 having tapered inner ends that move into tapered openings formed in the outer surface of the threaded sleeve 7, as clearly shown by Fig. 1 of the drawing.

Extending upwardly into the ring 6, are bores 11 which are so spaced apart that the fingers 12 of the wrench 13 may be positioned therein, to rotate the sleeve.

As clearly shown by Fig. 1 of the drawing, the wrench, because it is positioned in the openings that extend upwardly from the bottom of the ring 6, will fall by gravity from the ring, when the hands of the operator of the wrench are removed therefrom, thereby insuring against an operator inadvertently allowing the wrench to remain on the chuck, to be thrown therefrom when the chuck is started, with the resultant damage to property and injury to persons near the chuck.

From the foregoing it will be seen that due to the construction shown and described, chucks having threaded sleeves which have become worn to such a degree that they will no longer operate the jaws of a chuck, may be supplied with an adaptor ring as described, so that a wrench may be applied to the ring and the sleeve rotated to actuate the jaws of the chuck to grip the bit held within the chuck.

Because of the ring 6, it is unnecessary to discard the chuck since by adding the adaptor ring, the chuck may be repaired for further use.

What is claimed is:

The combination with a chuck having a threaded sleeve formed with a tapered inner surface movable over the cam surfaces of the chuck, operating the chuck, said sleeve having openings formed in the outer surface, of a ring having threaded bores extending transversely therethrough, fitted over the threaded sleeve, screws fitted within the threaded bores, the inner ends of the screws extending into the openings of the sleeve removably securing the sleeve to the chuck, said sleeve having vertical bores extending upwardly from the bottom thereof, the bores being arranged in a circular line, and in spaced relation with respect to each other for the reception of fingers of a wrench used in rotating the ring and sleeve.

LOUIS B. BROWN.

REFERENCES CITED

The following references are of record in the file of this patent:

UNITED STATES PATENTS

| Number | Name | Date |
|---|---|---|
| 671,461 | Warn | Apr. 9, 1901 |
| 1,011,975 | Lewis | Dec. 19, 1911 |
| 1,845,123 | Buhr | Feb. 16, 1932 |